May 8, 1962     R. L. STANTON ET AL     3,032,846
WIRE ROPE FITTING
Filed April 4, 1955

*INVENTORS*
ROBERT L. STANTON
WILLIAM H. MYERS

BY

ATTORNEY

United States Patent Office 3,032,846
Patented May 8, 1962

3,032,846
WIRE ROPE FITTING
Robert L. Stanton and William H. Myers, Muncy, Pa., assignors to Jones & Laughlin Steel Corporation, Pittsburgh, Pa., a corporation of Pennsylvania
Filed Apr. 4, 1955, Ser. No. 498,904
1 Claim. (Cl. 24—123)

This invention relates to a joint or splice for wire ropes and is concerned particularly with a joint or splice made by compressing a malleable sleeve around a pair of wire rope portions laid parallel and overlapping each other.

A type of wire rope joint or splice known to the art is that in which a pair of rope ends or a rope end and the standing portion of the same rope are laid parallel and overlapping within a sleeve of malleable metal. The sleeve is then compressed about the rope ends, the metal of said sleeve being forced into the interstices of the ropes thereby forming a firm joint or splice. A sleeve of this type is either oval in cross section or has parallel sides joined by semicircular end portions and is usually compressed into cylindrical shape. The necessary thickness of such a sleeve causes it to project beyond the surface of the rope an appreciable amount, and its end faces are always more or less perpendicular to its axis. Projecting sleeves of this type catch against objects when rope so spliced is pulled along the floor or passed around loads. It would be highly desirable to form such sleeves with one or both ends tapered toward the rope surface, but although such attempts have been made, it has proved impossible to compress sleeves into such shapes without cutting into at least the outer strands of the ropes spliced.

It is an object of our invention, therefore, to provide a wire rope joint of the compression sleeve type having a tapered end portion which minimizes or does away with the tendency of such sleeve to catch on objects against which the spliced rope may lie. It is another object of our invention to provide such a joint with a pre-formed tapered end. Other objects of our invention will appear in the course of the following description thereof.

Figure 1:
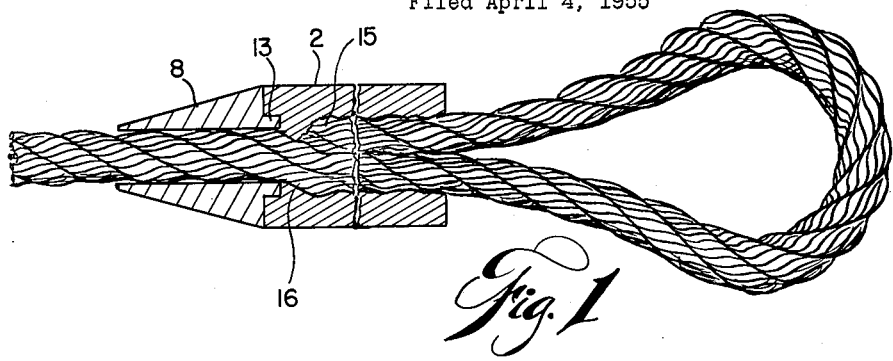
Figure 2:
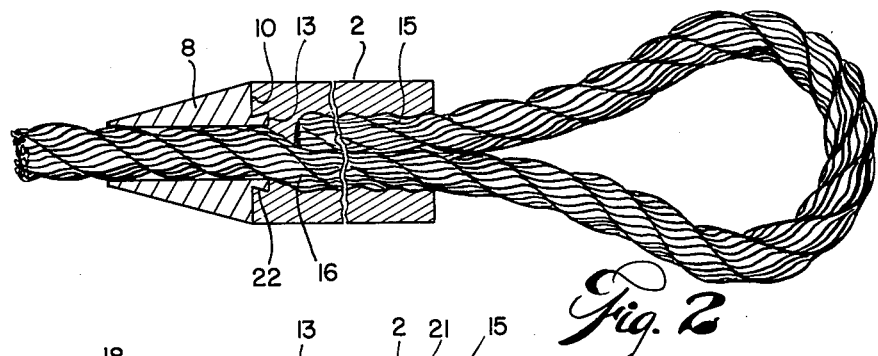
Figure 3:
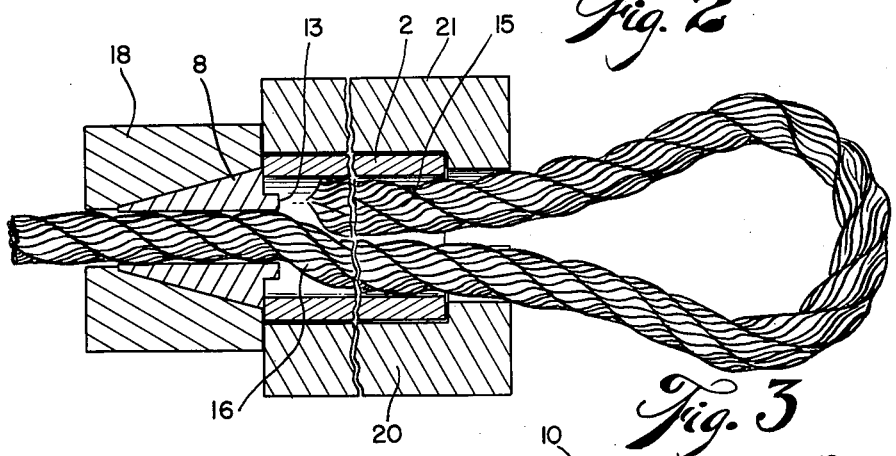
Figure 4:
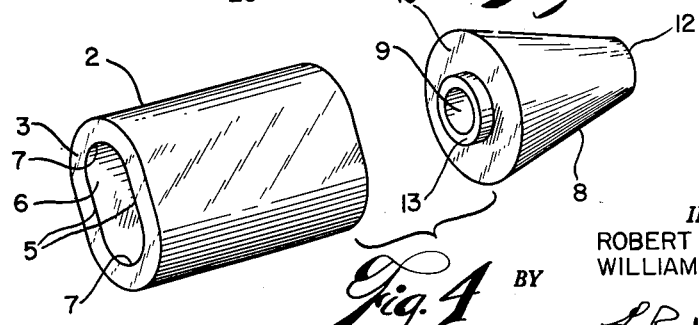

Present preferred embodiments of our invention are shown on the attached figures to which reference is now made. FIG. 1 represents a longitudinal cross section through a wire rope joint embodying our invention. FIG. 2 is a longitudinal cross section through a wire rope joint embodying our invention in a modified form. FIG. 3 is a longitudinal cross section through a wire rope joint embodying our invention, and dies suitable for forming it. FIG. 4 represents an exploded view in perspective of sleeve and end portions of a fitting suitable for forming the joint of our invention.

Our joint employs a two-part fitting; one part being a malleable sleeve of conventional design known to the art, and the other part a separate tapered end portion which is firmly attached to our joint and becomes a part thereof when it is formed by compression of the sleeve portion. Sleeve portion 2, which is made of a malleable metal, has a relatively thick wall 3 and is formed with a bore 6 of elongated cross section, as shown in FIG. 4, having parallel side wall portions 5 and semicircular end portions 7. End fitting 8 is frusto-conical in shape having a central bore 9 of diameter sufficient to admit a rope 16 of the desired size, a base 10 of a diameter equal to or perhaps slightly less than the exterior diameter of the finished joint, an apex 12, and a relatively thin annular ferrule 13 coaxial with bore 9 and projecting outwardly from the base 10. The bore 6 of sleeve 2 is made wide enough to receive ferrule 13 and long enough to receive a pair of overlapped rope portions 15 and 16.

The method by which our joint is made will be described with respect to the forming of a bight or loop from the end of the piece of rope but it will be understood that the method does not differ when it is desired to splice together the ends of two ropes. The end 15 of a wire rope is bent around and laid against a portion 16 of the standing end thereof. Sleeve 2 is slipped over ends 15 and 16 so positioned. Tapered end fitting 8 is slipped over rope 16 so that its base 10 adjoins one end face of sleeve 2 and ferrule 13 fits within sleeve 2. A die 18 provided with a conical bore dimensioned to receive end piece 8 is then placed around end piece 8. This die 18 may be split for convenience in assembly and disassembly but does not move with respect to end piece 8 during the forming of our joint. A split die having a lower portion 20 and an upper portion 21 is placed around sleeve 2 abutting die 18 previously mentioned. The interior surface of upper die 21 is formed into a semicylinder and the interior surface of lower die 20 is formed in the same fashion.

Dies 20 and 21 when in contact with uncompressed sleeve 2 are separated by a gap. When pressure is applied to dies 20 and 21, by hydraulic press means or other means, these dies travel toward each other until they meet, compressing sleeve 2 and rope portions 15 and 16 enclosed therein. The compression causes the metal of sleeve 2 to flow into the interstices of the rope portions 15 and 16. The metal of sleeve 2 also transmits compressive force to ferrule 13 of tapered end portion 8. Die 18 prevents tapered end portion 8 from moving axially with respect to sleeve 2 and therefore the compression of sleeve 2 deforms or distorts ferrule 13 slightly, forcing it against wire rope portion 16. When our joint is taken from the dies, therefore, sleeve 2 has been compressed into a cylindrical sleeve and tapered end piece 8 has been locked thereto by the distortion of ferrule 13, and both sleeve 2 and end portion 8 have been locked to wire rope portions 15 and 16 contained therein.

If desired, the outer surface of ferrule 13 may be undercut or tapered inwardly toward end face 10 as shown at 22 in FIG. 2. When the metal of sleeve 2 is compressed in dies 20 and 21 it is forced into the undercut 22, thereby locking end portion 8 to sleeve 2 of our joint. In this embodiment of our invention it is not necessary that ferrule 13 be deformed or compressed against rope portion 16.

We claim:

Rope clamping means comprising a swaged tubular rope clamp within which parallel strands of wire rope are clamped, with the strands forming a loop beyond one end of said tubular rope clamp and one strand only extending beyond the other end of said rope clamp, a rope end positioning and guiding supplementary separate end piece of outer conical shape surrounding said projecting strand, said strands within said swaged tubular clamp lying on opposite sides of the axis of said tubular rope clamp, said supplementary end piece having a bore with an outlet opening for the rope strand coaxial with said rope clamp to guide the projecting strand to coaxial position with said tubular rope clamp through the outer end of the end piece, said rope clamp and said supplementary end piece being by radial swaging brought into holding engagement with each other causing a material deformation of at least the rope clamp.

References Cited in the file of this patent
UNITED STATES PATENTS

| 1,643,110 | Briggs | Sept. 20, 1927 |
| 1,797,691 | Merrill | Mar. 24, 1931 |
| 2,346,412 | Bratz | Apr. 11, 1944 |
| 2,484,485 | Brickman | Oct. 11, 1949 |
| 2,862,993 | Schmidt | Dec. 2, 1958 |

FOREIGN PATENTS

| 12,151 | Great Britain | of 1915 |